US008388293B2

(12) United States Patent
Hutter, III

(10) Patent No.: US 8,388,293 B2
(45) Date of Patent: Mar. 5, 2013

(54) INSULATED AND SEALED CAP FOR A FASTENER COMPONENT

(75) Inventor: Charles G. Hutter, III, Carson City, NV (US)

(73) Assignee: Physical Systems, Inc., Carson City, NV (US)

( * ) Notice: Subject to any disclaimer, the term of this patent is extended or adjusted under 35 U.S.C. 154(b) by 0 days.

(21) Appl. No.: 13/406,141

(22) Filed: Feb. 27, 2012

(65) Prior Publication Data

US 2012/0219380 A1 Aug. 30, 2012

Related U.S. Application Data

(60) Provisional application No. 61/447,577, filed on Feb. 28, 2011.

(51) Int. Cl.
*A47G 3/00* (2006.01)
(52) U.S. Cl. .................................. 411/377; 411/431
(58) Field of Classification Search .................. 411/377, 411/316, 431, 82
See application file for complete search history.

(56) References Cited

U.S. PATENT DOCUMENTS

| 972,140 | A | * | 10/1910 | Adam | 411/429 |
| 2,823,479 | A | * | 2/1958 | Zdanowski | 40/661.09 |
| 3,470,787 | A | * | 10/1969 | Mackie | 411/377 |
| 4,923,348 | A | * | 5/1990 | Carlozzo et al. | 411/377 |
| 5,277,530 | A | * | 1/1994 | Sweeney et al. | 411/258 |
| 6,086,972 | A | * | 7/2000 | Rayburn et al. | 428/40.1 |

* cited by examiner

*Primary Examiner* — Gary Estremsky
(74) *Attorney, Agent, or Firm* — Lowry Blixseth LLP; Stuart O. Lowry; Scott M. Lowry

(57) ABSTRACT

An insulated, sealed cap overlies and protects a fastener component or the like on a substrate in association with a substrate opening. The sealed cap includes an outer cap component filled partially with a selected sealant material and assembled with an inner collet sized and shaped to fit with a slip fit about the fastener component such as a nut or the like at one side of a selected substrate, such as the skin of an aircraft. An inboard edge of the inner collet seats on and substantially seals with the substrate. The outer cap component is then displaced toward the substrate to extrude the sealant material into a thin and substantially uniform layer joined with an extruded outer bead on the substrate, and then permitted to cure. Tapered ribs on the inner collet effectively lock with the outer cap component during sealant material curing and subsequently.

10 Claims, 5 Drawing Sheets

INSULATED AND SEALED CAP FOR A FASTENER COMPONENT

BACKGROUND OF THE INVENTION

This invention relates generally to an insulated and sealed cap for use with a fastener component or the like passed through an opening formed in a selected substrate, to seal and protect the fastener component and/or the substrate opening against contact with and/or leakage of fluids contained within the substrate, or to safeguard system components and/or fluids contained within the substrate against damage attributable to electrical discharges and the like associated with the fastener component. More particularly, this invention relates to an improved insulated and sealed cap and related method of use wherein a relatively rigid or sturdy yet lightweight sealed cap is mounted onto the substrate in a position over a fastener component and related substrate opening.

Fastener components such as nuts and bolts are commonly mounted onto a substrate such as the skin of an aircraft or the like in association with a substrate opening. In this regard, such fastener components typically comprise a nut or nutplate at one side of a substrate opening adapted to receive a threaded bolt or the like therethrough for anchored engagement with the nut or nutplate. In modern aircraft, system components such as electronic devices are often disposed on one side of the substrate, such as internal system components mounted within an aircraft fuselage. Alternatively, the substrate commonly comprises a wing structure or the like defining one wall of an aircraft fuel tank containing corrosive and volatile aircraft fuel and perhaps some water.

In either case, it is highly desirable to seal the substrate and related substrate opening as well as the fastener component from contact or communication in either direction with the system components and/or fluids such as fuel. That is, it is desirable to prevent fluid leakage from the fuel tank into potentially corrosive contact with the fastener component and/or leakage through the substrate opening. Similarly, it is desirable to prevent damage to the system components and/or to the aircraft fuel supply attributable to electrical discharges associated with the fastener component. Moreover, it is desirable to prevent such damage by providing a sealed and insulated cap which is relatively study in design to withstand normal maintenance procedures without damage to the sealed cap. In an aircraft environment, in order to maximize overall fuel efficiency, it is desirable to provide these important sealing and insulating functions with minimal overall weight addition.

There exists, therefore, a need for an improved insulated and sealed protective cap for use on an aircraft substrate and the like. The present invention fulfills these needs and provides further related advantages.

SUMMARY OF THE INVENTION

In accordance with the invention, an insulated, sealed cap is provided for overlying and protecting a fastener component or the like on a selected substrate in association with a substrate opening. The sealed cap includes an outer cap component filled partially with a selected sealant material and assembled with an inner collet sized and shaped to fit relatively loosely but nonrotationally about the fastener component such as a nut or the like at one side of the selected substrate, such as the skin of an aircraft. An inboard edge of the inner collet seats on and substantially seals with the substrate. The outer cap component is then displaced toward the substrate to extrude the sealant material into a thin and substantially uniform insulation layer joined with an extruded outer bead on the substrate, and then permitted to cure. Tapered ribs on the inner collet effectively lock with the outer cap component during sealant material curing and subsequently.

In one preferred form, the outer cap component is partially filled with a metered quantity of the selected sealant material, followed by nested assembly of the inner collet into the outer cap component. In this configuration, the assembled insulated cap can be installed immediately in insulative and protective relation covering the fastener component at one side, such as the blind side, of the substrate. Alternately, the assembled insulated cap can be chilled and preferably frozen to prevent immediate curing of the sealant material until time for use. In the latter case, the frozen insulated cap with the sealant material therein is thawed and preferably heated slightly before use.

The assembled insulated cap is fitted over the fastener component such as a nut or a nutplate adapted to receive a threaded bolt or the like passed through the substrate opening, with an inboard edge of an inner collet side wall landing in seated and substantially sealed relation onto the substrate in a position circumscribing the fastener component and associated substrate opening. The fit between the inner collet of the assembled cap and the fastener component is preferably a slip fit. In this initial configuration, the sealant material remains primarily within a space between closed end walls of the outer cap component and the inner collet.

The outer cap component is then pressed downwardly, or in a direction toward the substrate, to extrude the sealant material between the outer cap component and the inner collet in a direction toward the substrate. In this regard, the outer cap component and the inner collet are preferably formed from a relatively rigid or sturdy, and preferably nonmetallic material such as a selected and relatively lightweight molded plastic or fiber composite or the like. These interfitting structures each define a substantially closed end wall joined with a side wall such as a generally cylindrical side wall having a selected and preferably matching taper. Tapered lock ribs are formed between these two interfitted components, such as external ribs formed on the inner collet to extend from the inner collet inboard edge over about ½ of the side wall height, for effectively locking the interfitted components together while maintaining a desired yet relatively thin or uniform spacing between the component side walls.

The metered quantity of sealant material is selected so that as an inboard edge of the outer cap component lands on the substrate, said inboard edge of the outer cap component contact and seals with a bead of the extruded sealant material. Importantly, following a suitable cure time, this extruded bead provides an effective seal between the outer cap component and the substrate, regardless of the specific substrate geometry. That is, the substrate geometry may require this extruded bead to be thicker in some areas than in others.

The resultant insulated cap assembly installed onto the substrate in surrounding relation with the fastener component thus provides a substantially effective yet relatively thin and lightweight insulative seal to overlie and protect the fastener component and associated substrate opening. That is, the sealed cap presents a relatively sturdy cap construction constructed from a lightweight molded plastic or the like having sufficient structural rigidity to withstand typical maintenance procedures without puncture and/or damage which might otherwise undesirably interfere with the desirable insulative and sealed functions. Similarly, the sealed cap insulates the system components and/or fluids on the opposite side of the sealed cap against potential damage to attributable to electrical discharges and the like at the fastener component and/or through the substrate opening. If desired, one of the outer cap component and the inner collet, such as the inner collet, can be constructed from an at least partially electrically conductive material to define a Faraday shield separating the fastener component from internal aircraft components and/or the aircraft fuel supply.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is an exploded perspective view depicting an outer cap component and an inner collet of an insulated and sealed cap for mounting onto a selected substrate to overlie and protect a fastener component or the like;

DETAILED DESCRIPTION OF THE PREFERRED EMBODIMENTS

Figure 1:
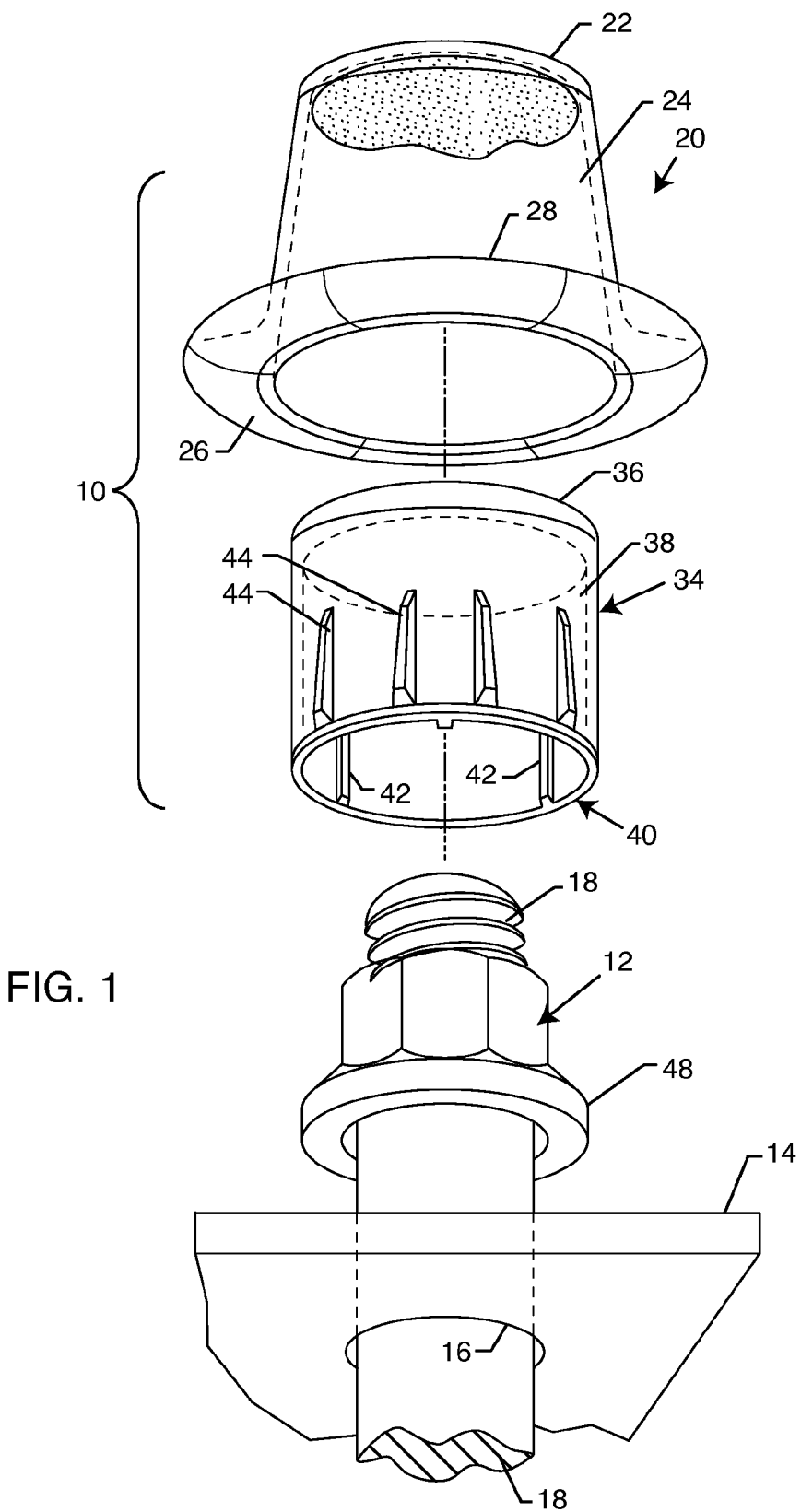

As shown in the exemplary drawings, an insulated and sealed cap referred to generally in FIGS. 1 and 3-8 by the reference numeral 10 is provided for insulating and sealing a fastener component 12 such as the illustrative nut shown in FIGS. 1 and 4-7 mounted at one side of a selected substrate 14. This fastener component 12 is commonly associated with an opening or passage 16 (FIGS. 1 and 5-7) formed in the substrate 14 through which a threaded bolt 18 or the like is commonly fitted for threaded assembly with the nut 12. The insulated and sealed cap 10 of the present invention overlies and protects the fastener component 12 and the substrate opening 16 against undesirable damage to the fastener component 12 attributable to contact with system components (not shown) and/or with fluids (also not shown) on the fastener component side of the substrate 14. In addition, the insulated and sealed cap 10 of the present invention beneficially protects the system components and/or fluids against damage attributable to the presence of the typically metallic fastener component 12, such as electrical discharges and the like. These bidirectional insulating and sealing functions are advantageously provided by the cap 10 in a lightweight but sturdy cap construction that is conducive to quick and easy mounting onto the substrate 14.

Figure 2:
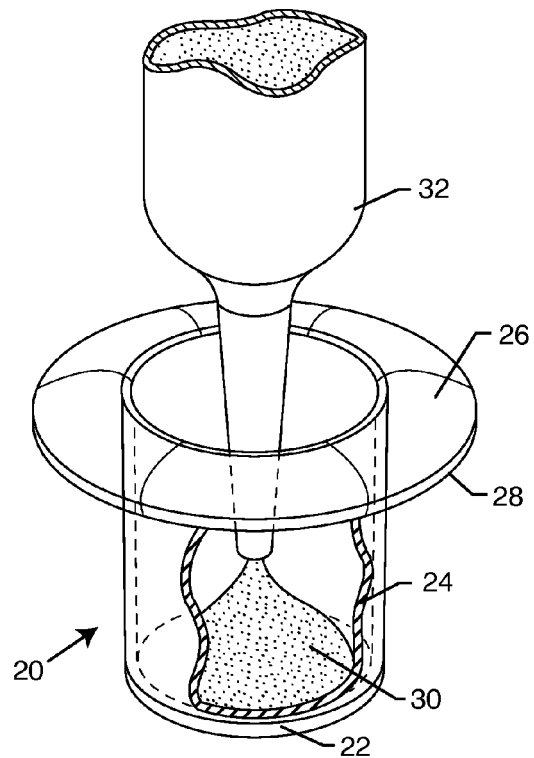
FIG. 2 is an inverted and fragmented perspective view showing partial filling of the outer cap component thereof with a metered quantity of a curable sealant material.
Figure 3:
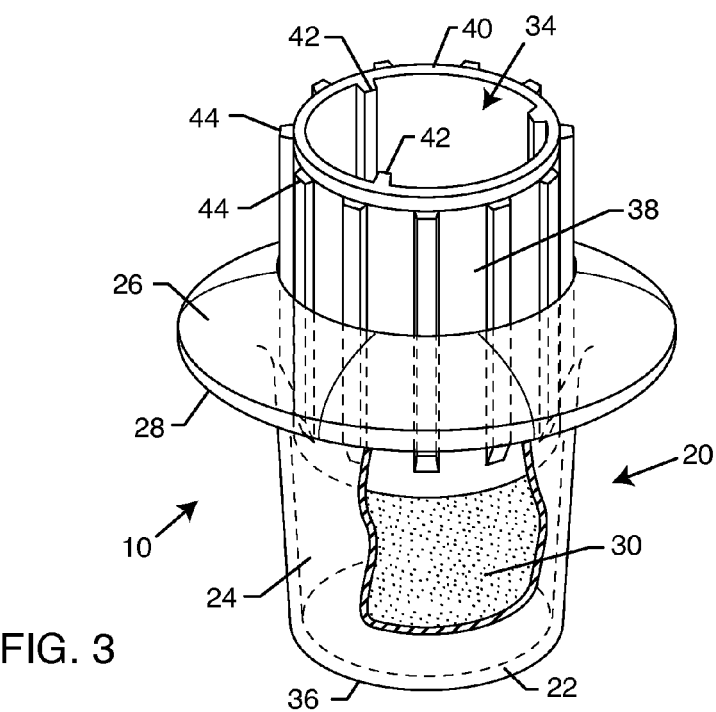
FIG. 3 is an inverted perspective view showing the outer cap component in assembled relation with the inner collet.

As shown in FIGS. 1 and 3, the insulated and sealed cap 10 of the present invention comprises an outer cap component 20 having a preferred, generally hat-shaped configuration to include a substantially closed top end wall 22 joined to a depending side wall 24 which in turn has a generally open lower edge 26 defined by an outwardly radiating lower flange 28. This outer cap component 20 is initially and partially filled with a metered quantity of a selected and uncured but curable sealant or adhesive material 30 by means of a suitable dispenser 32 (FIG. 2). While a manual dispenser 32 is shown in FIG. 2, persons skilled in the art will understand that a succession of the outer cap components 20 may be partially filled with the desired metered quantity of the selected sealant material by means of an automated dispenser, if desired.

One preferred sealant material comprises a polysulfide sealant. An exemplary sealant material is available from PPG Aerospace, division of PPG Industries, Pittsburgh, Pa., under product designation PR 1440. An alternative exemplary sealant material is available from the same company under product designation PR 1422.

With the metered quantity of the selected sealant material contained within the inverted outer cap component 20, an inner collet 34 is partially assembled within the outer cap component 20, as viewed best in FIG. 3. As shown, this inner collet 34 also defines a substantially closed end wall 36 joined to a side wall 38 defining a lower or free edge 40 at the axial end thereof opposite the end wall 36. In addition, FIGS. 1 and 3 show the collet 34 to include a plurality of typically at least three equiangularly spaced internal or inwardly radiating ribs 42, and a plurality of external lock ribs 44 projecting radially outwardly therefrom over at least about the lower ½ of the height of the associated side wall 38 from the lower free edge 40. In a preferred form, these lock ribs 44 have a downwardly (toward the lower free edge 40) expanding taper on the order of about 1-3 degrees.

Figure 5:
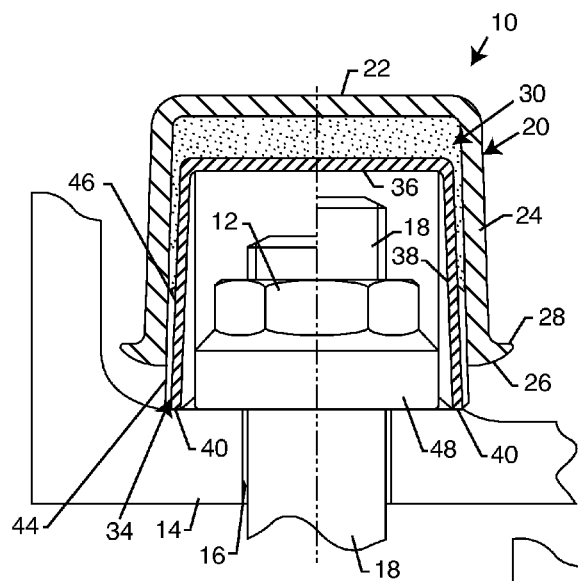
FIG. 5 is an enlarged vertical sectional view showing initial placement of the insulated and sealed cap onto a substrate, with the inner collet positioned over a nut or other fastener component.
Figure 6:
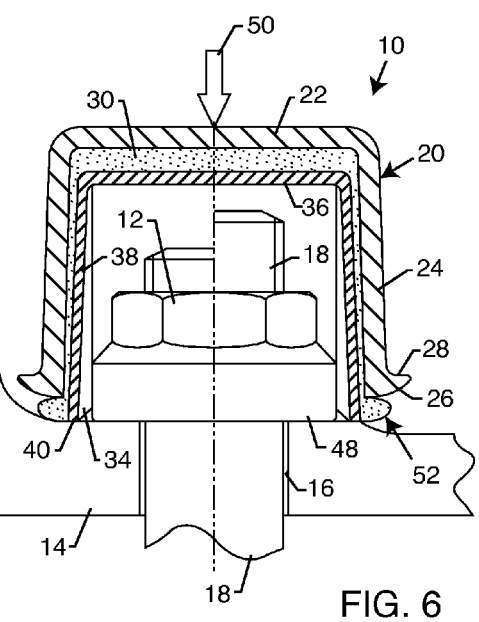
FIG. 6 is an enlarged vertical sectional view similar to FIG. 5, and illustrating advancement of the outer cap component in a downward direction toward the substrate relative to the inner collet to extrude the sealant material therebetween.

The inner collet 34 has a slightly tapered side wall shape for substantially nested but relatively close slide-fit reception into a matingly tapered side wall 24 of the outer cap component 20, with the respective end walls 22, 36 in adjacent albeit spaced relation (shown best in FIG. 5). The outer lock ribs 44 of the inner collet 34 are engaged but not locked with the outer cap component 20. In addition, as shown in FIG. 5, the lower or free edge 40 of the inner collet 34 is axially spaced below the lower edge 26 and flange 28 of the outer cap component 20. In this position, the metered quantity of sealant material 30 fills the space between the end walls 22, 36 of the outer cap component 20 and the inner collet 34, and partially fills the narrow radial space between the respective side walls 24, 38 (FIG. 5). Importantly, a leading annular edge 46 of the sealant material 30, in this position, is retracted as viewed in FIG. 5 from the lower edge 26 and related flange 28 of the outer cap component 20, so that physical contact with the uncured sealant material 30 is not possible.

In this configuration, with the insulated and sealed cap 10 containing the uncured sealant material 30, the cap 10 can be employed immediately (as will be described herein), or alternately the cap 10 with the uncured sealant material 30 can be chilled and preferably frozen to prevent curing of the sealant material 30 until the cap 10 is ready for installation. In this regard, the cap 10 is preferably frozen for shipment and/or storage preparatory to use. Just before cap usage is desired, the frozen cap 10 with frozen sealant material 30 therein is thawed preferably by short heating in a microwave oven or the like to melt the sealant material 30 and permit curing thereof.

Figure 4:
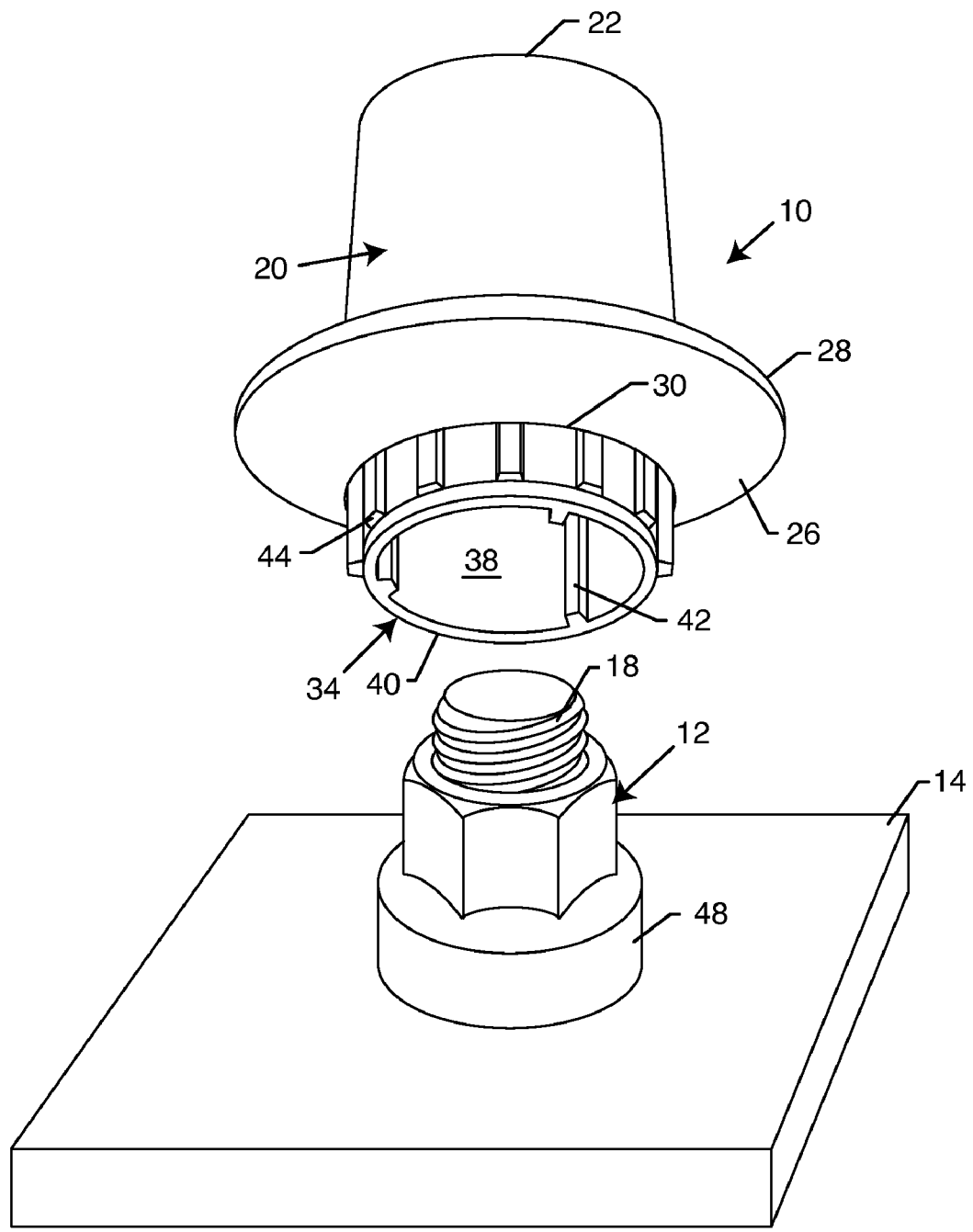
FIG. 4 is a perspective view depicting placement of the insulated and sealed cap of FIGS. 1 and 3 over a fastener component previously installed onto the substrate.

In use, the assembled insulated and sealed cap 10 is placed onto the fastener component 12, such as the illustrative nut, with the lower free edge 40 of the inner collet 34 substantially seated and substantially sealed upon the substrate 14 in circumscribing relation but with a slip fit relative to the fastener component 12. FIGS. 1 and 4-5 show this fastener component 12 in the form of a nut having a generally circular base segment 48 for suitable engagement with the internal collet ribs 42 to prevent easy rotation of the cap 10 relative to the fastener component 12. Persons skilled in the art will recognize and appreciate that the fastener component 12 may take other known forms, such as a standard nut lacking the cylindrical base 48, a nutplate mounted onto the substrate 14, etc.

Figure 7:
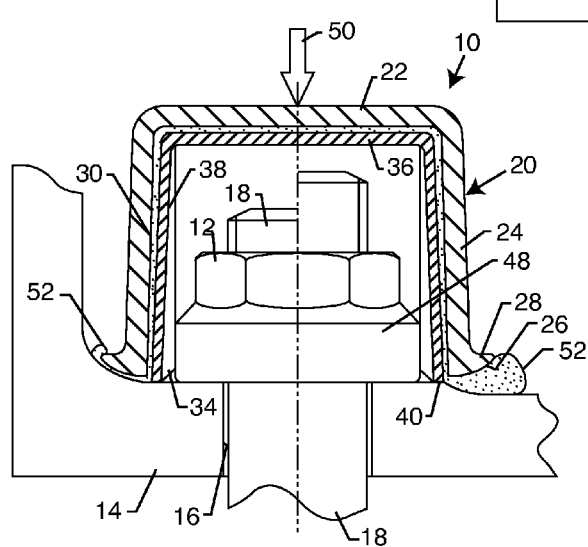
FIG. 7 is an enlarged vertical sectional view similar to FIGS. 5 and 6, but depicting final extruded displacement of the sealant material for protectively overlying and sealing the nut or other fastener component on the substrate.

After initial seating of the lower or free edge 40 of the inner collet 34 onto the substrate 14, as viewed in FIG. 5, the outer cap component 20 is displaced relative to the inner collet 34 in a downward direction (as viewed in FIGS. 6-7) toward the substrate 14. Such outer cap displacement in the direction of arrow 50 in FIGS. 6-7 effectively extrudes the sealant material 30 downwardly from between the end caps 22, 36 and through a narrow annular space between the side walls 24, 38, between the lock ribs 44, to extrude outwardly at the bottom of the outer cap component 20 to form an annular bead 52. As the outer cap component 20 is displaced further in the direction of arrow 50 (FIG. 7), the lower edge 26 thereof at the underside of the flange 28 lands in this sealant material bead 52 for secure and sealed attachment to the substrate 14. As shown in FIG. 7, this bead 52 can be of a varying geometric shape to accommodate fillets and the like formed in a substrate 14 of complex geometry. That is, the specific size and/or height of this bead 52 can be larger on one side of the fastener component 12 than on the other or opposite side.

Full displacement of the outer cap component 20 until the lower edge 26 thereof is fully landed within the bead 52 of sealant material 30 is accompanied by effective locking of the outer cap component 20 onto the inner collet 34 by means of the lock ribs 44. That is, as the outer cap component 20 is displaced toward the substrate 14, the magnitude of engagement between the outer cap component 20 and the inner collet 34 is effectively increased and rigidified by the lock ribs 44. In the fully landed position of the outer cap component 20, the sealant material 30, 52 is allowed to cure typically for a few hours.

Figure 8:
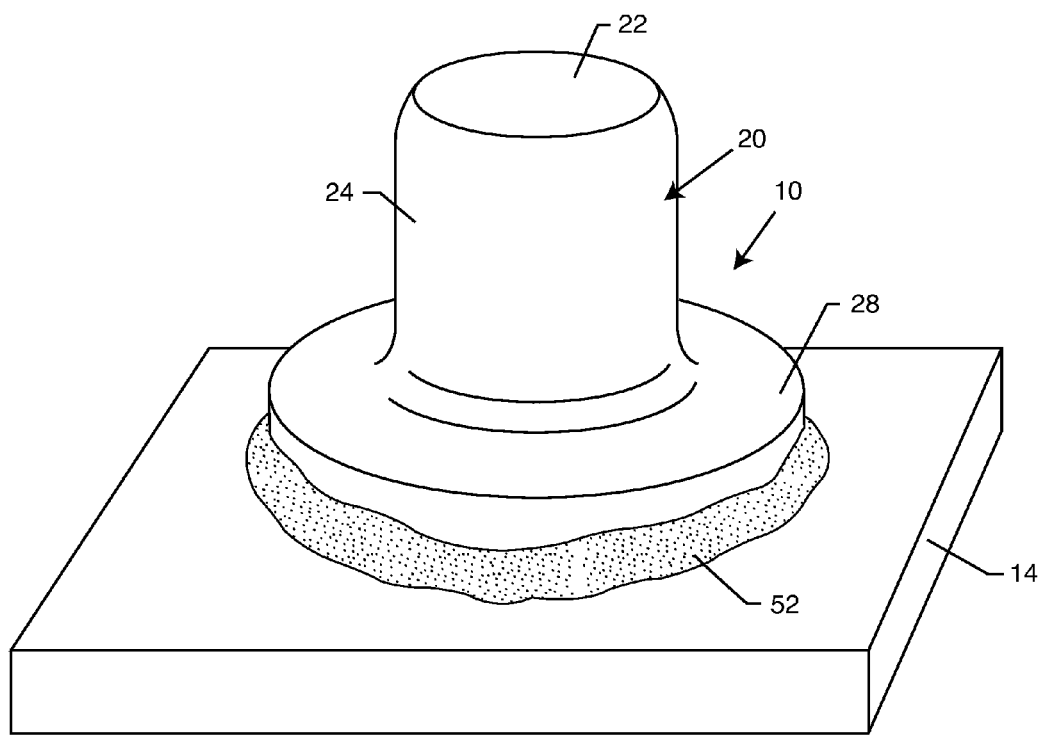
FIG. 8 is a perspective view similar to FIG. 4, but showing the insulated and protective cap installed onto the substrate in protective relation over the nut or other fastener component.

FIG. 8 shows the protective cap 10 of the present invention in insulated and sealed mounting relation onto the substrate 14, in a position covering the underlying fastener component (not shown in FIG. 8) and related access opening (also not shown in FIG. 8) formed in the substrate 14. In this position, the cap 10 functions to effectively insulate and seal the fastener component or components 12 from potential damage due to system components (not shown) or fluids (also not shown) on the cap side of the substrate 14. Similarly, the cap 10 functions to effectively insulate and seal any system components and/or fluids at the illustrated cap side of the substrate 14 from potential damage attributable to events and/or structures (not shown) located at the opposite side of the substrate 14 and/or the fastener component or components 12 associated with the substrate access opening 16.

The insulated and sealed cap 10 provides a substantially effective yet relatively thin and lightweight insulative seal to overlie and protect the fastener component or components and associated substrate opening. That is, the sealed cap presents a relatively sturdy cap construction constructed from a lightweight molded plastic or the like having sufficient structural rigidity to withstand typical maintenance procedures without puncture and/or damage which might otherwise undesirably interfere with the desirable insulative and sealed functions. If desired, one of the outer cap component 20 and the inner collet 34, such as the inner collet 34, can be constructed from an at least partially electrically conductive material, such as an at least partially metallic material, to define a Faraday shield separating the fastener component from internal aircraft components and/or the aircraft fuel supply.

A variety of further modifications and improvements in and to the improved insulated and sealed cap of the present invention, and its related method of use, will be apparent to those persons skilled in the art. As one example, although the illustrative drawings shown interfitting side walls 24, 36 of the outer cap component 20 and the inner collet 34 to be of generally cylindrical shape, persons skilled in the art will understand and appreciate that the interfitting side walls 24, 36 may be of any selected shape, including but not limited to a noncircular shape suitable to fit nonrotationally over a fastener component 12, and/or an elongated shape such as an oval suitable to fit over multiple closely spaced fastener components. Accordingly, no limitation on the invention is intended by way of the foregoing description and accompanying drawings, except at set forth in the appended claims.

What is claimed is:

1. An insulated and sealed cap for sealing an opening in a selected substrate, said cap comprising:
    an outer cap component having a generally hat-shaped configuration to include a top wall joined to a depending side wall joined in turn to a short outwardly radiating flange;
    a relatively rigid inner collet having a top wall joined to a depending side wall terminating at a lower edge, said inner collet having a size and shape to fit in generally nested relation within said outer cap component;
    a curable sealant material partially filling the space between said outer cap component and said inner collet;
    said inner collet lower edge being substantially landable on the substrate in a position circumscribing the substrate opening, and said outer cap component being thereupon displaced toward the substrate to extrude the sealant material between said side walls of said outer cap component and said inner collet to form a bead adhered to the substrate in a position between the substrate and said flange of said outer cap component to form a curable insulated and sealed connection therebetween; and
    further including a fastener component associated with the substrate opening, said inner collet further comprising a plurality of at least three inner ribs for slip fit engagement with respect to the fastener component.

2. The insulated and sealed cap of claim 1 wherein said side walls of said outer cap component and said inner collet are tapered to extend radially outwardly from said top walls thereof.

3. The insulated and sealed cap of claim 2 further including a plurality of lock ribs between said side walls of said outer cap component and said inner collet to extend over at least about ½ the height therebetween from said inner collet lower edge.

4. The insulated and sealed cap of claim 3 wherein said lock ribs are tapered to extend radially outwardly from upper ends thereof to lower ends thereof generally adjacent said inner collet lower edge at an angle of about 1-3 degrees.

5. The insulated and sealed cap of claim 3 wherein said lock ribs are formed externally on said side wall of said inner collet.

6. The insulated and sealed cap of claim 1 wherein said outer cap component and said inner collet are formed from an insulative material.

7. The insulated and sealed cap of claim 6 wherein at least one of said outer cap component and said inner collet is formed from a partially electrically conductive material to provide a Faraday shield.

8. The insulated and sealed cap of claim 1 wherein said sealant material is retracted from said outer cap component flange upon landing of said inner collet lower edge on the substrate and prior to displacement of said outer cap component in a direction toward the substrate.

9. An insulated and sealed cap for sealing an opening in a selected substrate, said opening having a fastener component associated therewith, said cap comprising:
   an outer cap component having a generally hat-shaped configuration to include a top wall joined to a depending side wall joined in turn to a short outwardly radiating flange;
   an inner collet having a top wall joined to a depending side wall terminating at a lower edge, said inner collet having a size and shape to fit in generally nested relation within said outer cap component, said inner collet further including a plurality of at least three inner ribs for non-rotational engagement with the fastener component;
   a curable sealant material partially filling the space between said outer cap component and said inner collet;
   said inner collet further comprising a plurality of lock ribs on an external surface of said side wall to extend from said lower edge thereof at least about ½ of said inner collet height, said lock ribs being tapered to extend radially outwardly from the upper ends thereof at an angle of about 1-3 degrees; and
   said inner collet lower edge being substantially landable on the substrate in a position circumscribing the substrate opening, said sealant material being retracted from said outer cap component flange upon said landing of said inner collet lower edge on the substrate, said outer cap component being thereupon displaced toward the substrate to extrude the sealant material between said side walls of said outer cap component and said inner collet to form a bead adhered to the substrate in a position between the substrate and said flange of said outer cap component to form a curable insulated and sealed connection therebetween.

10. A method of installing an insulated and sealed cap onto a selected substrate in a position for sealing an opening formed in the substrate, said method comprising the steps of:
   forming an outer cap component having a generally hat-shaped configuration to include a top wall joined to a depending side wall joined in turn to a short outwardly radiating flange;
   partially filling the outer cap component with a metered quantity of a selected curable sealant material;
   forming an inner collet having a top wall joined to a depending side wall;
   assembling the inner collet with the outer cap component by nested reception of the inner collet into the outer cap component, whereby the sealant material is disposed primarily with the space between the top walls of said outer cap component and said inner collet, said sealant material defining a lower edge between said side walls of said outer cap component and said inner collet and initially retracted from said outer cap component flange;
   landing the inner collet lower edge on the substrate in substantially circumscribing relation to the substrate opening;
   displacing the outer cap component on the inner collet in a direction toward the substrate to extrude the sealant material to form an insulating and sealing bead engaged between said outer cap component flange and the substrate; and
   permitting the sealant material to cure.

\* \* \* \* \*